Oct. 26, 1965

S. C. POLLOCK 3,213,478

WINDSHIELD WIPER MECHANISM

Filed Jan. 27, 1964

INVENTOR.
Samuel C. Pollock
BY
W. E. Finken
ATTORNEY

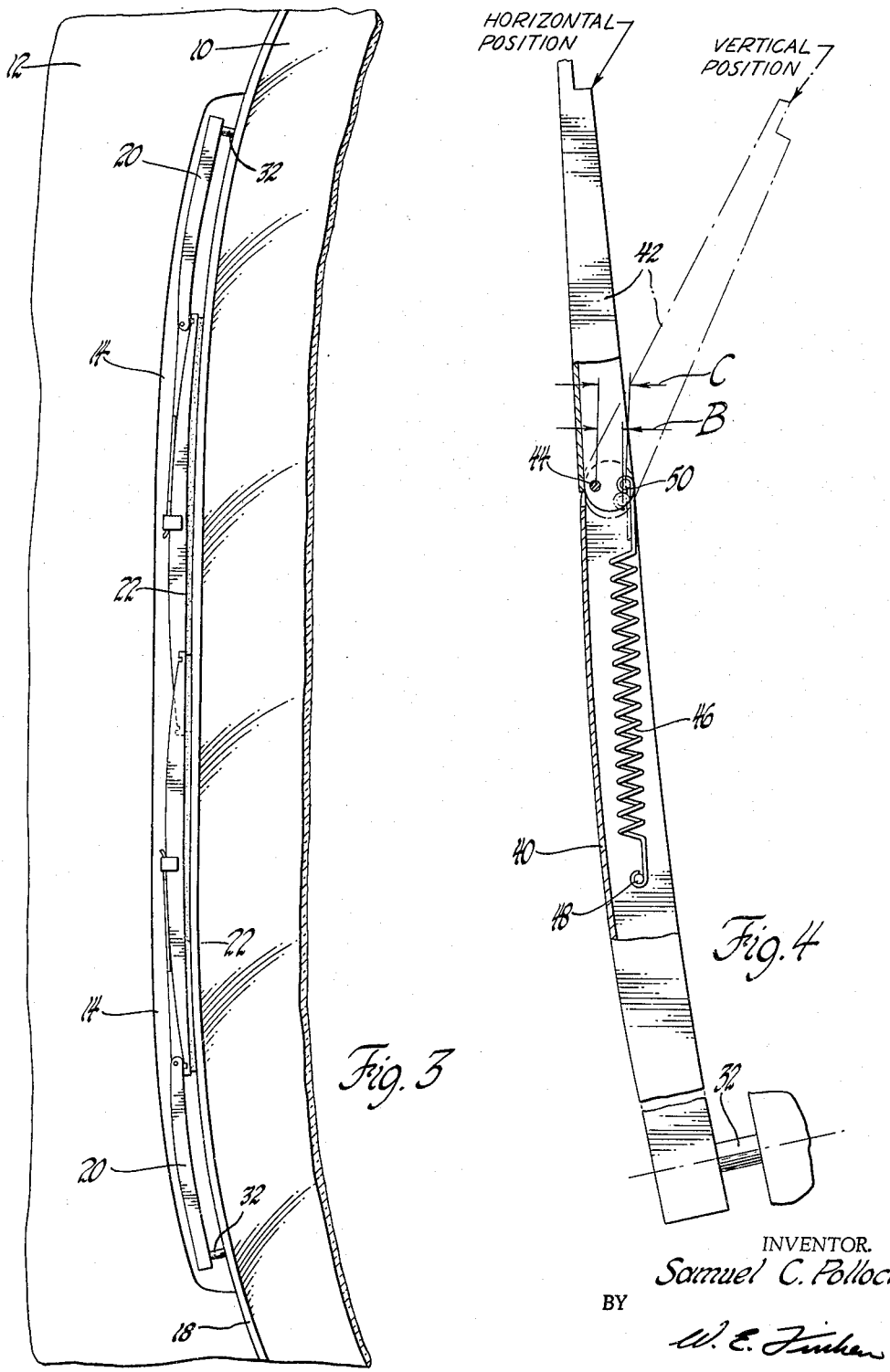

United States Patent Office 3,213,478
Patented Oct. 26, 1965

3,213,478
WINDSHIELD WIPER MECHANISM
Samuel C. Pollock, Rochester, Mich., assignor to General Motors Corporation, Detroit, Mich., a corporation of Delaware
Filed Jan. 27, 1964, Ser. No. 340,265
5 Claims. (Cl. 15—250.16)

This invention pertains to windshield cleaning mechanism, and particularly to an improved wiper mechanism for vehicular windshields which is concealed when not in use.

Heretofore, it has been proposed to locate the pivot shafts of a vehicular windshield wiper mechanism within a well located forwardly of the windshield and to move the wiper arm and blade assemblies into the well when the wiper mechanism is not in use so as to conceal the same from view. A system of this type wherein the access opening is closed by a cover is disclosed in copending application Serial No. 214,916, filed August 6, 1962 in the name of Stanley N. Massoll, of common assignee, now Patent No. 3,121,902. The present invention relates to an improved wiper mechanism of the type which is concealed when not in use, but wherein the need for a cover is eliminated by decreasing the width of the access opening. Another aspect of the present invention comprehends the optimum location of the pivot shaft axes relative to the windshield and the provision of wiper arms which produce a substantially elliptical wiping pattern and are capable of movement through an access opening of minimal width into and out of the well without interference with the body structure.

Accordingly, among my objects are the provision of improved vehicular windshield wiper mechanism which is concealed in a well when not in use; the further provision of vehicular windshield wiper mechanism wherein the pivot shafts are angularly offset from a perpendicular relation to the rearwardly inclined plane of the windshield to facilitate movement of the wiper arm and blade assemblies through an access opening of minimum width; and the still further provision of wiper mechanism including means for obtaining a substantial elliptical wiping pattern and increasing the effective wiper arm pressure as the blades move from a vertical to a substantially horizontal position.

The aforementioned and other objects are accomplished in the present invention by locating the axes of the pivot shafts for a pair of spaced windshield wiper arm and blade assemblies within a well in the vehicle cowl, and offsetting the axes of the pivot shafts through an optimum angle away from a perpendicular to the rearwardly inclined plane of the windshield and towards the horizontal. In addition, in order to enable movement of the blade and arm assemblies through an access opening of minimum width, each wiper arm comprises interconnected inner and outer sections of substantially equal length. A pressure applying spring is associated with the pivotal connection for applying pressure to a wiper blade carried by the outer section, and the geometry of the spring hinge connection is such as to optimize both the moment arm and the spring pressure so as to provide a maximum wiper blade pressure when the two arm sections are in substantial alignment. The arrangement of the mechanism is such as to produce a substantial elliptical wiping pattern having a minimum radius when the wiper arms and blades are substantially vertical and a maximum radius when the wiper arms and blades are substantially horizontal.

Further objects and advantages of the present invention will be apparent from the following description, reference being had to the accompanying drawings, wherein a preferred embodiment of the present invention is clearly seen.

In the drawings:

FIGURE 3 is a fragmentary plane view taken in the direction of arrow 3 of FIGURE 2.

FIGURE 4 is a fragmentary view partly in section and partly in elevation, depicting the improved wiper arm construction and its mode of operation.

Figure 1:
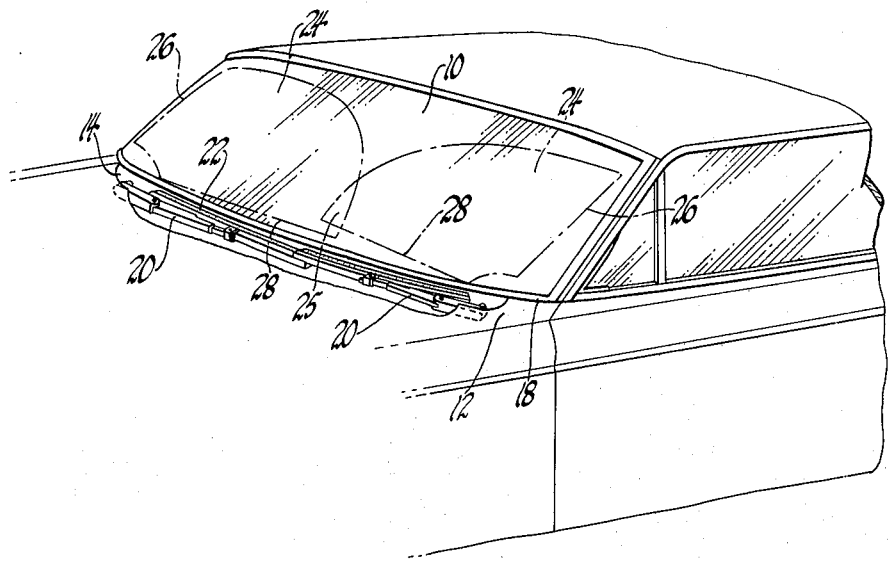
FIGURE 1 is a fragmentary perspective view of a vehicle equipped with the improved windshield wiper mechanism of the present invention.
Figure 2:
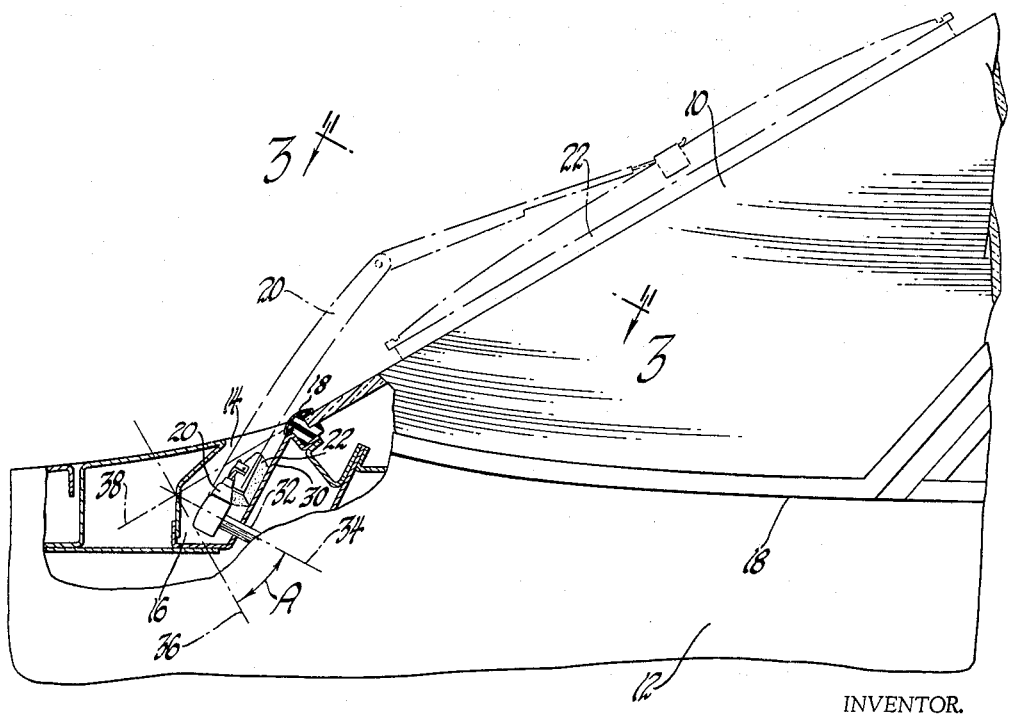
FIGURE 2 is a fragmentary side view with certain parts broken away, partly in section and partly in elevation, of the improved vehicular windshield wiper mechanism.

Referring to FIGURES 1 and 2, a vehicle is shown having a curved, single piece rearwardly inclined windshield 10 having substantial curvature in horizontal section. The vehicle includes a forwardly extending cowl structure 12 having an elongate transversely extending access opening 14 therein of minimal width. The cowl structure 12 is formed with a well 16 disposed forwardly and beneath the lower edge of the windshield 10. As is customary, the windshield edges are concealed from view by a reveal molding 18.

The windshield cleaning mechanism, as seen in FIGURE 1, comprises a pair of spaced wiper arms 20 which carry wiper blades 22 at their outer ends, the wiper blades 22 being of known construction and capable of conforming to surfaces of varying curvature as well as to substantially planar surfaces. The wiper blades 22 are movable throughout wiping paths 24 across the outer surface of the windshield, the paths of the wipers overlapping the area 25 at the center of the windshield 10. The wiping path, or pattern, 24 produced by each wiper blade is substantially elliptical since it has a greater horizontal radius than vertical radius as will be pointed out more particularly hereinafter. During operation of the cleaning mechanism, the wiper blades 22 are movable throughout running strokes having outboard limits 26 and inboard limits 28, and when the cleaning mechanism is inactivated, the wiper blades 22 are moved to depressed parked positions within the well 16 as shown in FIGURES 1 through 3 whereat they engage a ramp, or side wall, 30 of the well 16.

In order to maintain the width of the access opening 14 at a minimum, so as to obviate the necessity of a cover, the axes of the pivot shafts for oscillating the spaced wiper arms are offset towards the horizontal from the perpendicular to the rearwardly inclined plane of the windshield 10. As seen in FIGURE 2, each wiper arm 20 is drivingly connected to an oscillatable pivot shaft 32 rotatably journalled in a suitable bracket, now shown, attached to the vehicle. Each pivot shaft 32 projects through an opening in the side wall 30 of the well 16 and has its axis 34 offset throughout an angle A from a perpendicular 36 to the rearwardly inclined plane of the windshield 38 and towards the horizontal. The amount of angular offset from a perpendicular to the plane of the glass will, of course, vary with the degree of the curvature on the horizontal section of the windshield, but in the present invention the angle A is of approximately 30°. It is pointed out that during movement of the wiper blades from within the well 16 and into contact with the windshield 10 to the blades are supported by the ramp 30 and pass over the reveal molding 18. It is to be understood that the pivot shafts 32 are connected by suitable drive mechanism to a wiper motor, not shown, for imparting oscillation thereto in phase opposition.

Referring particularly to FIGURES 2 through 4, each wiper arm 20 comprises spring hinge connected elongate inner and outer sections 40 and 42 of substantially equal length. The inner section 40 of each wiper arm is drivingly connected to its respective pivot shaft 32 and is connected by a transversely extending hinge pin 44 to its outer, or blade carrying, section 42. The blade carrying section 42 is biased towards the windshield 10 by an extension spring 46 having one end connected to a spring retainer 48 carried by the inner arm section and the other end connected to a spring retainer 50 carried by the outer arm section 42. It is to be noted that by virtue of the angular offset of the pivot shaft axes 34 from a perpendicular to the plane of the windshield 10, as shown in FIGURE 2, the outer wiper arm section 42 is oriented through a substantial angle to the inner arm section when the wiper blade 22 is in a substantially vertical position as shown in phantom in FIGURE 2. Under these conditions, the effective length of the wiper arm is shortened thereby producing a minimum radius adjacent the outboard stroke end 26 of the wiping pattern 24 of each wiper blade. On the other hand, as the wiper blades move towards their horizontal positions, or their inboard stroke end positions 28, due to the horizontal curvature of the windshield 10, the outer arm section 42 moves to a position more nearly in alignment with the inner arm section 40 thereby effectively increasing the length of the wiper arm so as to have a maximum radius. It is in this manner that a substantially elliptical wiping pattern is produced as alluded to hereinbefore. In addition, the effective force produced by the extension spring 46 increases as the wiper arm sections 40 and 42 move into alignment with each other, and this is achieved both by extension of the spring 46 and by increasing the moment arm through which the spring acts.

Referring particularly to FIGURE 4, it will be noted that the moment arm of the spring 46 acting on the outer arm section 42 in its vertical position, shown in phantom, that is, the perpendicular distance between the line of force of the spring and the axis of the pivot 44, is a distance B. However, when the arm sections 40 and 42 are in substantial alignment, not only is the spring 46 extended but it acts through a greater moment arm, namely the moment arm C. It is in this manner that the effective pressure applied to the wiper blades is increased and the effective length of the wiper arms is increased during movement from a vertical position to a substantially horizontal position, or in other words between the outboard stroke end limits 26 and the inboard stroke end limits 28 as depicted in FIGURE 1.

From the foregoing it is apparent that the present invention provides a simplified concealed windshield cleaning mechanism wherein the wiper blades are moved throughout substantially elliptical patterns due to an automatic increase in the effective length of the wiper arms as they move from vertical positions toward horizontal positions. In addition, the mechanism of the present invention automatically provides an increase in the effective wiping pressure concurrently with increasing the effective length of the wiper arms. Moreover, the entire mechanism can be concealed from view by movement into a well having a minimal width access opening which obviates the necessity for a cover.

While the embodiment of the invention as herein disclosed constitutes a preferred form, it is to be understood that other forms might be adopted.

What is claimed is as follows:

1. In a vehicle, a rearwardly inclined windshield having substantial curvature in horizontal section, a cowl having a transversely extending well therein disposed forwardly and beneath the lower edge of the windshield, an access opening in said cowl, an oscillatable pivot shaft disposed in said well having its axis angularly offset toward the horizontal from a perpendicular to the rearwardly inclined plane of said windshield, a wiper arm having spring hinge connected inner and outer sections, the inner arm section being drivingly connected to said pivot shaft within said well, and a wiper blade carried by the outer section and movable between a substantially horizontal stowed position within said well and an operating position in engagement with said windshield, the inner and outer sections of said wiper arm being of substantially equal length so as to permit movement of said wiper arm and blade into and out of said well through said access opening and enabling said access opening to be of minimal width.

2. In a vehicle, a rearwardly inclined windshield having substantial curvature in horizontal section, a cowl having a transversely extending well therein disposed forwardly and beneath the lower edge of the windshield, an access opening in said cowl, an oscillatable pivot shaft disposed in said well having its axis angularly offset toward the horizontal from a perpendicular to the rearwardly inclined plane of said windshield, a wiper arm having spring hinge connected inner and outer sections of substantially equal length, the inner arm section being drivingly connected to said pivot shaft within said well, and a wiper blade carried by the outer arm section and movable between a substantially horizontal stowed position within said well and an operating position in engagement with said windshield, said inner and outer wiper sections being moved into substantial alignment due to said substantial curvature in horizontal section of said windshield so as to facilitate movement into and out of said well through said access opening and enabling said access opening to be of minimal width.

3. In a vehicle, a rearwardly inclined windshield having substantial curvature in horizontal section, a cowl having a transversely extending well therein disposed forwardly and beneath the lower edge of the windshield, an access opening in said cowl, an oscillatable pivot shaft disposed in said well having its axis angularly offset toward the horizontal from a perpendicular to the rearwardly inclined plane of said windshield, a wiper arm having an elongate inner section drivingly connected to said pivot shaft, an elongate outer section pivotally connected to said elongate inner section and of substantially equal length, and spring means interconnecting the inner and outer sections and biasing the outer section towards said windshield, and a wiper blade carried by the outer arm section and movable between a horizontal stowed position within said well and an operating position in engagement with said windshield, the inner and outer sections of said wiper arm being moved into substantial alignment in said horizontal stowed position due to the substantial curvature in horizontal section of said windshield so as to facilitate movement of said wiper arm and blade into and out of said well through said access opening and enabling said access opening to be of minimal width.

4. The combination set forth in claim 3 wherein said wiper arm and blade are movable throughout a running stroke having predetermined inboard and outboard stroke end limits, said wiper arm and blade having a substantially horizontal position at said inboard stroke end and a substantially vertical position at said outboard stroke end, the outer section of said wiper arm being moved out of alignment with said inner arm section at it moves towards a vertical position and into alignment with said inner arm section as it moved towards a horizontal position so as to automatically decrease the effective length of said wiper arm as it moves towards a vertical position and increases the effective length of said wiper arm as it moves towards the horizontal position.

5. The combination set forth in claim 4 wherein the spring interconnecting the inner and outer arm sections acts through a moment arm of varying length dependent upon the angular relationship between the inner and outer arm sections, said moment arm being of maximum length when the inner and outer arm sections are in substantial alignment and decreasing as the inner and outer arm sections are moved out of alignment whereby the pressure applied to said wiper blade by said wiper arm is a maximum when the wiper blade is in a substantially horizontal position and a minimum when the wiper blade is in a substantially vertical position.

References Cited by the Examiner
UNITED STATES PATENTS

| | | | |
|---|---|---|---|
| 2,167,207 | 7/39 | Horton | 15—250.34 |
| 3,120,673 | 2/64 | Buchwald | 15—250.17 |

CHARLES A. WILLMUTH, *Primary Examiner.*